(12) United States Patent
Yuan

(10) Patent No.: US 9,532,350 B2
(45) Date of Patent: Dec. 27, 2016

(54) METHOD AND SYSTEM FOR PHYSICAL DOWNLINK CONTROL CHANNEL MULTIPLEXING

(71) Applicant: Yifei Yuan, Iselin, NJ (US)

(72) Inventor: Yifei Yuan, Iselin, NJ (US)

(73) Assignee: ZTE (USA) Inc., Austin, TX (US)

( * ) Notice: Subject to any disclaimer, the term of this patent is extended or adjusted under 35 U.S.C. 154(b) by 14 days.

(21) Appl. No.: 14/374,114

(22) PCT Filed: Jan. 28, 2013

(86) PCT No.: PCT/US2013/023360
§ 371 (c)(1),
(2) Date: Jul. 23, 2014

(87) PCT Pub. No.: WO2013/116127
PCT Pub. Date: Aug. 8, 2013

(65) Prior Publication Data
US 2015/0029996 A1   Jan. 29, 2015

Related U.S. Application Data

(60) Provisional application No. 61/592,247, filed on Jan. 30, 2012.

(51) Int. Cl.
*H04W 72/04* (2009.01)
*H04W 72/12* (2009.01)
*H04L 5/00* (2006.01)

(52) U.S. Cl.
CPC .......... *H04W 72/042* (2013.01); *H04L 5/0053* (2013.01); *H04W 72/121* (2013.01)

(58) Field of Classification Search
CPC .................................................. H04W 72/121
(Continued)

(56) References Cited

U.S. PATENT DOCUMENTS

| 6,545,997 B1 | 4/2003 | Bohnke et al. |
| 2010/0002638 A1 | 1/2010 | Park et al. |

(Continued)

FOREIGN PATENT DOCUMENTS

| JP | 2000068975 A | 3/2000 |
| KR | 20080073645 A | 8/2008 |

(Continued)

OTHER PUBLICATIONS

LG-Ericsson: "Consideration on enhanced PDCCH to REs mapping", 3GPP Draft, R1-114189, vol. RAN WG1, No. 67, Nov. 8, 2011, XP050562133.

(Continued)

*Primary Examiner* — Shripal Khajuria
(74) *Attorney, Agent, or Firm* — Drinker Biddle & Reath LLP

(57) ABSTRACT

Enhanced physical downlink control channel are multiplexed with physical downlink data channel in frequency division multiplexing (FDM), or in frequency division multiplexing (FDM)+time division multiplexing (TDM). FDM mode applies to users that have only UL grants in that subframe. UL grants of different users are cross-interleaved and transmitted over the entire physical resource blocks (both slots) in FDM. Frequency resources for cross-interleaved UL grants are distributed. TDM+FDM applies to users that have both DL and UL grants, or have only DL grant in that subframe. DL/UL grant (maybe mixed) is transmitted only in the first slot of physical resource blocks in TDM+FDM, where the second slots in those resource blocks can be used for those users' downlink data transmission.

21 Claims, 1 Drawing Sheet

(58) Field of Classification Search
USPC .......................................................... 370/330
See application file for complete search history.

(56) References Cited

U.S. PATENT DOCUMENTS

| | | |
|---|---|---|
| 2011/0243059 A1 | 10/2011 | Liu et al. |
| 2011/0249633 A1 | 10/2011 | Hong et al. |
| 2013/0208645 A1 | 8/2013 | Feng et al. |

FOREIGN PATENT DOCUMENTS

| | | |
|---|---|---|
| KR | 20110112750 A | 10/2011 |
| WO | WO-20110126212 A2 | 10/2011 |
| WO | WO-20110126247 A2 | 10/2011 |
| WO | WO-20110160799 A1 | 12/2011 |

OTHER PUBLICATIONS

Motorola Mobility: "Initial analysis of EPDCCH link performance", 3GPP Draft, R1-114030, vol. TSG RAN1, No. 63, Nov. 21, 2011, XP050562453.
European Supplemental Search Report EP 13 74 3972, dated Aug. 11, 2015.
International Search Report for PCT/US2013/023360 mailed May 16, 2013.

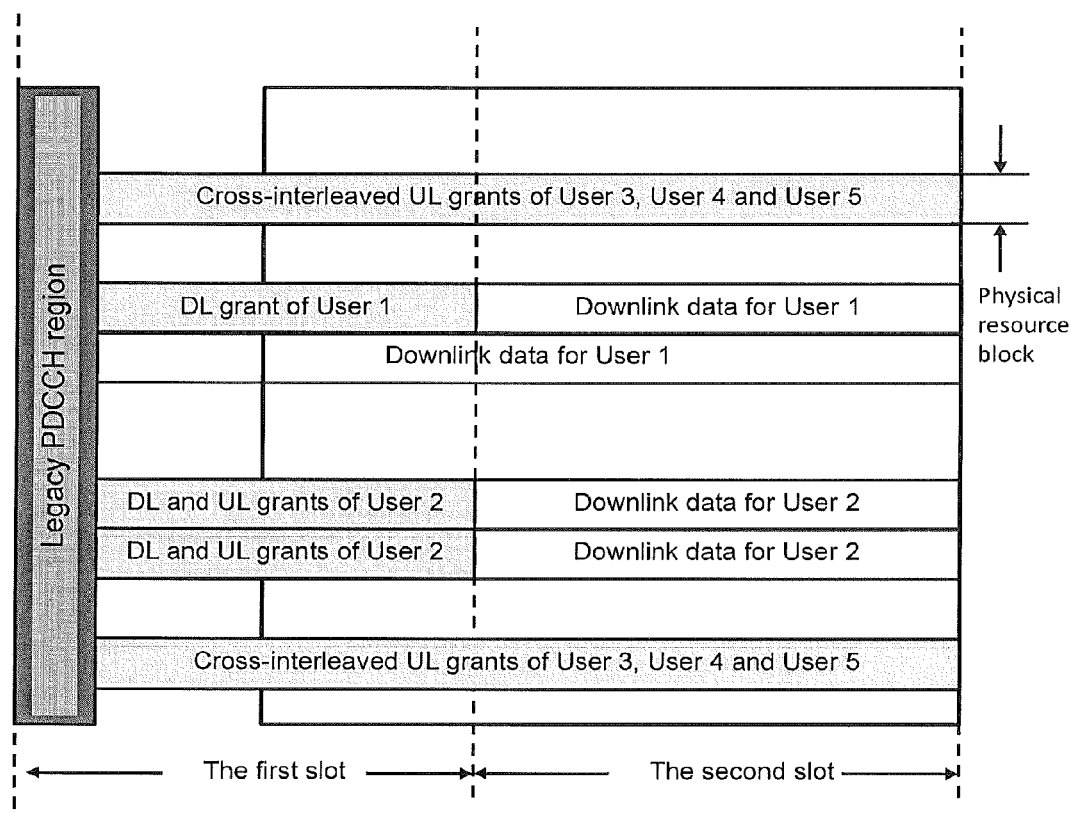

METHOD AND SYSTEM FOR PHYSICAL DOWNLINK CONTROL CHANNEL MULTIPLEXING

FIELD OF THE INVENTION

The present invention relates to a method and system for physical downlink control channel multiplexing and the associated blind decoding. Specifically, the invention relates to resource multiplexing between physical downlink control channel and the data channels.

BACKGROUND OF THE INVENTION

Modern wireless communications standards and systems rely on intricate scheduling schemes to efficiently utilize the limited radio resources and maximize the system throughput. 4G cellular standards feature orthogonal frequency division multiple access (OFDMA) where resource scheduling is needed for both downlink and uplink transmission. The scheduling is done at the base station in a centralized fashion, and the scheduling grants can be for downlink transmission or uplink transmission. Both downlink and uplink grants are transmitted in Physical Downlink Control CHannel (PDCCH). The adjective "physical" before "downlink control channel" emphasizes that such control signaling occurs very frequently, i.e., every 1 ms, so that it can dynamically adapt to the fast fading of the channel. Frequent signaling, although crucial for dynamic link adaptation, is very expensive, in the sense that its overhead is high, in particular for those mobile terminals at cell edges. Hence, there should be a limit for the overhead of physical downlink control channel, so that there are enough physical resources for downlink data transmissions.

In 3GPP LTE, physical downlink control channel (PDCCH) is time multiplexed with Physical Downlink Shared Channel (PDSCH) which carries the downlink data. More specifically, the physical control channel occupies the entire first few OFDM symbols, spanning over the whole system bandwidth. Downlink and uplink grants of different users are encoded, modulated, cross-interleaved and mapped to those OFDM symbols, designated for PDCCH. The design principles of PDCCH are: 1) to concentrate PDCCH in the first few OFDM symbols to allow earlier decoding of DL/UL grants; 2) to ensure robust decoding of PDCCH. The purpose of the cross-interleaving and the spreading over entire system bandwidth is to randomize the frequency-selective fading and interference, and to achieve robustness.

In LTE-A relay, a new physical control channel is introduced to the relay backhaul link, called relay physical downlink control channel (R-PDCCH) [1]. R-PDCCH takes some resources in the downlink data channel (PDSCH) region. R-PDCCH can occupy an entire physical resource block (PRB) pair consisting of two slots, or just one slot of PRB. When both slots are occupied by R-PDCCH, the multiplexing between R-PDCCH and PDSCH is called frequency division multiplexing (FDM). When only one slot (especially the first slot) is occupied by R-PDCCH, the multiplexing between R-PDCCH and PDSCH is called time division multiplexing (TDM)+frequency division multiplexing (FDM). To reduce the decoding latency, DL grants for relay backhaul link can only be transmitted in the first slot(s) of PRB pair(s), whereas UL grants for relay backhaul can only be transmitted in the second slot(s) of PRB pair(s). R-PDCCH can be cross-interleaved or non cross-interleaved over different relay nodes. For cross-interleaved R-PDCCH, only common reference signal (CRS) can be used for demodulation. The cross-interleaved R-PDCCH bears a lot resemblance to PDCCH where the decoding robustness is a top consideration. Due to CRS demodulation, cross-interleaved R-PDCCH cannot benefit from beamforming, similar to PDCCH. Cross-interleaving also prevents the frequency selective scheduling gain. In contrast, the design principle of non cross-interleaved R-PDCCH is to exploit beamforming and frequency selective gain where demodulation reference signal (DMRS) is preferred. DMRS is present only in physical resource blocks that contain R-PDCCH or PDSCH, and goes through the same precoding as R-PDCCH or PDSCH. Therefore, precoding is totally transparent to R-PDCCH, i.e., no need for separate signaling to indicate precoding matrices used at the transmitter.

Traditional cellular networks consist primarily of macro base stations whose transmit power and antenna gains are the same. The site-to-site distance is almost constant and the network grids are quite uniform. The fast growing demand for system capacity motivates the deployment of a large number of low power nodes such as remote radio head (RRH) pico, femto nodes, to offload the traffic from the macro and increase the throughput in hot-spots. The mixture of macro, remote radio head, pico and femto cells constitutes the so called heterogeneous networks (HetNets). Interference scenarios become more complex in HetNets, not only for data channels such as PDSCH, but also for control channels such as PDCCH. There are several interference coordination schemes for PDSCH in HetNets deployment, one of them being partial frequency reuse where orthogonal resources are allocated for users near cell edges. However, such scheme cannot be used for PDCCH since it occupies the entire system bandwidth. In another HetNet scenario, remote radio head (RRH) is with the same cell ID as of macro cell, thus appearing transparent to users. Transparent RRH can significantly improve the system throughput by dynamic joint transmission over macro antennas and RRH. But, it has issue with limited resources for PDCCH which is shared by all scheduled users within the coverage area, i.e., there is no cell splitting gain of PDCCH. So there is a strong motivation of improving the capacity of PDCCH and mitigating the strong interference in HetNets. The enhanced physical downlink control channel is called ePDCCH.

SUMMARY OF THE INVENTION

In accordance with one aspect, the present invention comprises a method of resource multiplexing between the physical downlink control channel and physical downlink data channel. The physical downlink control channel contains scheduling grants for downlink data transmissions (DL grants) and scheduling grants for uplink data transmissions (UL grants). The method comprises the resource mapping in two cases: 1) cross-interleaving UL grants of different users and mapping them to a set of physical resource blocks that span over two slots. No downlink data channel is allowed to be transmitted in those physical resource blocks. So the multiplexing between downlink control channel and downlink data channel is frequency division multiplexing (FDM); 2) mixing the DL grant and the UL grant (if present) of one user and mapping them to the first slot(s) of physical resource blocks. Here, downlink data channel can be transmitted in the second slots of physical resource blocks. The multiplexing between downlink control channel and downlink data channel is time division multiplexing (TDM)+ frequency division multiplexing (FDM).

According to the present invention, the cross-interleaving of UL grants is applied to users that have only UL grants in that subframe. Mixing DL grant and UL grant is applied to users that have both DL and UL grants, or have only DL grant in that subframe.

According to the present invention, a user would first try to blindly decode the DL grant and UL grant in the first slots of physical resource blocks. If no grant is detected, the user would then try to blindly decode the UL grant in the first and the second slots of physical resource blocks.

According to the present invention, the physical resource blocks for cross-interleaved UL grants and the physical resource blocks for mixed DL/UL grants are separate and configured independently by higher layer signaling.

According to the present invention, the physical resource blocks for cross-interleaved UL grants are distributed over the frequency.

In another aspect, the invention comprises a system that has downlink physical control channel containing scheduling grants for downlink and uplink data transmissions. The system comprises cross-interleaving UL grants of different users and mapping them to both slots of physical resource blocks, mixing DL/UL grants of a user and mapping them to the first slot of physical resource blocks.

BRIEF DESCRIPTION OF THE FIGURES

FIG. 1 shows an example of resource multiplexing of enhanced physical downlink control channel and downlink data channel.

DETAILED DESCRIPTION OF THE INVENTION

The invention considers four key design principles for enhanced physical downlink control channels: 1) to facilitate frequency domain interference coordination; 2) to exploit beamforming/precoding gain and frequency selectivity gain; 3) to reduce the decoding latency; 4) to ensure certain robustness of control channel decoding. Frequency domain interference coordination can be achieved by FDM multiplexing between downlink control channel and downlink data channel, for example, putting UL grants into the entire resource blocks, first and second slots. Different cells can configure different physical resource blocks for UL grants to avoid interference. Beamforming/precoding gain and frequency selectivity gain can be obtained by allowing TDM+FDM multiplexing between downlink control channel and downlink data channel, for example, putting DL/UL grant in the same resource blocks as for downlink data transmission, with the same precoding. Decoding latency can be kept small by restricting DL grants only in the first slot of physical resource blocks. Certain robustness of UL grant decoding can be accomplished by frequency distributed allocation of physical resource blocks and cross-interleaving of UL grants of different users. Cross-interleaving of UL grants also increases the packing efficiency, which helps to improve the control channel capacity.

The invention is illustrated in an example shown in FIG. 1. There are five users, User 1 to 5, scheduled in this subframe. Each subframe contains two slots. We focus on the resource region not belonging to the legacy PDCCH (dark gray area). The light gray area is used for enhanced physical downlink control channel (ePDCCH) transmission. User 1 has only DL grant. User 2 has both DL grant and UL grant. User 3, User 4 and User 5 have only UL grants. DL grant of User 1 is transmitted in the first slot of a resource block where the second slot is used for User 1's downlink data transmission. User 1 also uses the adjacent resource block (in both the first and the second slots) for its downlink data transmission. DL grant and UL grant of User 2 are mixed and transmitted in the first slot of two resource blocks. User 2's downlink data is transmitted in the second slot of those two resource blocks. DL/UL grants of User 1 and User 2 can enjoy beamforming/precoding gain and frequency selectivity gain, the same way as their downlink data channels. UL grants of User 3, User 4 and User 5 are cross-interleaved, and mapped to both the first and the second slots of the two resource blocks. Those two resource blocks are frequency distributed to provide frequency diversity for decoding robustness.

In FIG. 1, the number of physical resource blocks for DL/UL grants in the first slot is three in FIG. 1. The number of physical resource blocks for UL grants in both the first slot and the second slot is two. Their numbers and locations are configured by higher layers.

User 1 to 5 first try to blindly decode DL/UL grants in the first slot of the three resource blocks. Assuming that DL/UL grant decoding has no errors, User 1 detects its DL grant which indicates that its downlink data is to be transmitted in those two adjacent resource blocks. Since User 1 knows that its DL grant occupies one of the physical resource blocks, it would proceed to decode the downlink data in the rest of total 3 slots in those two resource blocks. Upon the detection of its DL and UL grant, User 2 proceeds to decode the downlink data in the rest of total 2 slots in the two adjacent resource blocks. After the decoding in the first slot, User 3, User 4 and User 5 do not detect their DL/UL grants. Then they try to blindly decode the cross-interleaved UL grants in both slots of the two resource blocks. Upon the detection of those UL grants, User 3, User 4 and User 5 should prepare for UL data transmission in the next few subframes.

Many modifications and alterations of the new methods and systems described herein may be employed by those skilled in the art without departing from the spirit and scope of the invention which is limited only by the claims.

REFERENCES

[1] 3GPP TS 36.216, "Evolved Universal Terrestrial Radio Access (E-UTRA): Physical layer for relaying operation."

The invention claimed is:

1. A method of multiplexing physical downlink control channel and physical downlink data channel in two cases comprising:
   determining uplink (UL and downlink (DL) needs of a plurality of users and generating subframes based on the determined needs, including:
   1) cross-interleaving scheduling grants for uplink data transmissions (UL grants) of different users and mapping the cross-interleaved UL grants to entire physical resource blocks containing first and second slots in which no physical downlink data channel is allowed to be transmitted, and wherein downlink control channel and physical downlink data channel for another user are multiplexed using frequency division multiplexing (FDM);
   2) mixing scheduling grants for downlink data transmission (DL grant) and for uplink data transmission (UL grant, if it is present) of a single user, and mapping both the DL grant and the UL grant to a first slot of physical resource blocks in which the second slot is allowed to be used for the single user's downlink data transmission, wherein downlink control channel and physical downlink data channel for another user are multiplexed using frequency division multiplexing (FDM)+time division multiplexing (TDM).

2. The method of claim 1, wherein one of the different users' UL grant is cross-interleaved with the other users' UL grants and transmitted in both slots when the one user has only UL grant in that subframe.

3. The method of claim 1, wherein a user's UL grant is not cross-interleaved with other users' UL grants when the UL grant of this user is transmitted only in the first slot.

4. The method of claim 3, wherein the user's UL grant is transmitted only in the first slot when this user also has DL grant (and therefore DL data transmission) in that subframe.

5. The method of claim 1, wherein a user tries to blindly decode both its DL grant and its UL grant in the first slot of a set of physical resource blocks, and in the case both are not detected, the user tries to blindly decode its UL grant in both slots of the set of physical resource blocks.

6. The method of claim 5, further comprising:
separately configuring the set of physical resource blocks in which the UL grants of the different users are cross-interleaved for transmission, and another set of physical resource blocks mixing the DL and UL grants of the single user for transmission, wherein the configuration is via higher layer signaling.

7. The method of claim 6, wherein the physical resource blocks for cross-interleaved UL grants transmission are frequency distributed.

8. An apparatus for multiplexing physical downlink control channel and physical downlink data channel for a plurality of users comprising:
a base station configured to generate and transmit subframes containing:
first physical resource blocks having a first slot and a second slot in both of which no physical downlink data channel is allowed to be transmitted;
second physical resources blocks having a second slot in which physical downlink data channel is allowed to be transmitted; and
other resource blocks in which resource multiplexing is used to mix downlink control channel and physical downlink data channel;
wherein, in the first physical resource blocks, scheduling grants for uplink data transmissions (UL grants) of different users are mixed using cross-interleaving, and the cross-interleaved grants are mapped to the entire physical resource blocks in the first and the second slots, and wherein the resource multiplexing used in the other resource blocks is frequency division multiplexing (FDM); and
wherein, in the second physical resource blocks, scheduling grants for downlink data transmission (DL grant) and for uplink data transmission (UL grant, if it is present) of a single user are mixed and mapped to the first slot, and wherein the resource multiplexing used in the other resource blocks is frequency division multiplexing (FDM)+time division multiplexing (TDM).

9. The apparatus of claim 8, wherein a user's UL grant is cross-interleaved with other users' UL grants and transmitted in both slots when this user has only UL grant in that subframe.

10. The apparatus of claim 8, wherein a user's UL grant is not cross-interleaved with other users' UL grants when the user's UL grant is transmitted only in the first slot of that subframe.

11. The apparatus of claim 10, wherein the user's UL grant is transmitted only in the first slot when the user also has DL grant (and therefore DL data transmission) in that subframe.

12. The apparatus of claim 8, wherein the user receives the transmitted subframe and tries to blindly decode its DL/UL grant in the first slot of a set of physical resource blocks, and if both are not detected, the user tries to blindly decode its UL grant in both slots of the set of physical resource blocks.

13. The apparatus of claim 12 wherein the sets of physical resource blocks, including sets in which the UL grants of the different users are cross-interleaved for transmission, and sets in which the DL and UL grants of the single user are mixed for transmission, are configured via higher layer signaling.

14. The apparatus of claim 13, wherein the physical resource blocks for cross-interleaved UL grants transmission are frequency distributed.

15. A system for multiplexing physical downlink control channel and physical downlink data channel comprising:
a base station configured to generate and transmit subframes containing:
first physical resource blocks having a first slot and a second slot in both of which no physical downlink data channel is allowed to be transmitted;
second physical resources blocks having a second slot in which physical downlink data channel is allowed to be transmitted; and
other resource blocks in which resource multiplexing is used to mix downlink control channel and physical downlink data channel;
wherein, in the first physical resource blocks, scheduling grants for uplink data transmissions (UL grants) of different users are mixed using cross-interleaving, and the cross-interleaved grants are mapped to the entire physical resource blocks in the first and the second slots, and wherein the resource multiplexing used in the other resource blocks is frequency division multiplexing (FDM); and
wherein, in the second physical resource blocks, scheduling grants for downlink data transmission (DL grant) and for uplink data transmission (UL grant, if it is present) of a single user are mixed and mapped to the first slot, and wherein the resource multiplexing used in the other resource blocks is frequency division multiplexing (FDM)+time division multiplexing (TDM); and
a plurality of users (UEs) each configured to receive and decode the subframes sent by the base station.

16. The system of claim 15, wherein a user's UL grant is cross-interleaved with other users' UL grants and transmitted in both slots when this user has only UL grant in that subframe.

17. The system of claim 15, wherein a user's UL grant is not cross-interleaved with other users' UL grants when the UL grant of this user is transmitted only in the first slot in that subframe.

18. The system of claim 17, wherein the user's UL grant is transmitted only in the first slot when the user also has DL grant (and therefore DL data transmission) in that subframe.

19. The system of claim 15, wherein a user that receives the transmitted frame tries to blindly decode both its DL grant and its UL grant in the first slot of a set of physical resource blocks and, if both are not detected, the user tries to blindly decode its UL grant in both slots of the set of physical resource blocks.

20. The system of claim 19, wherein the sets of physical resource blocks, including sets in which the UL grants of the different users are cross-interleaved for transmission, and sets in which the DL and UL grants of the single user are mixed for transmission, are configured via higher layer signaling.

21. The system of claim 15, wherein the physical resource blocks for cross-interleaved UL grants transmission are frequency distributed.

* * * * *